(No Model.)
T. A. EDISON.
PROCESS OF AND APPARATUS FOR GENERATING ELECTRICITY.
No. 460,122. Patented Sept. 29, 1891.
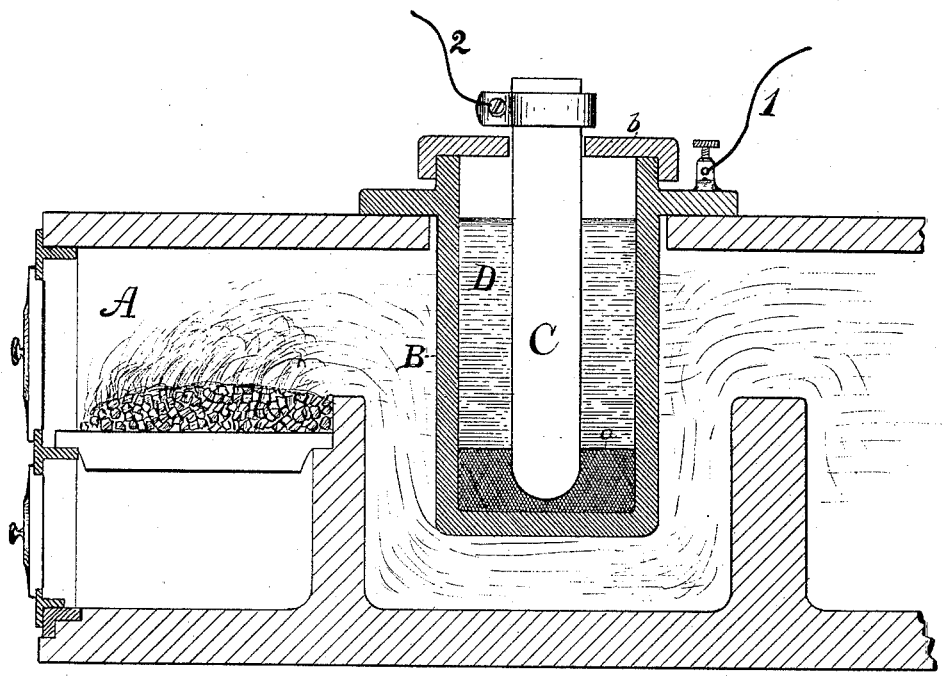
WITNESSES:
E. C. Rowland
C. P. Mott
INVENTOR:
Thomas A. Edison,
BY Rich? N. Dyer,
ATTORNEY.

UNITED STATES PATENT OFFICE.

THOMAS A. EDISON, OF MENLO PARK, NEW JERSEY.

PROCESS OF AND APPARATUS FOR GENERATING ELECTRICITY.

SPECIFICATION forming part of Letters Patent No. 460,122, dated September 29, 1891.

Application filed May 26, 1882. Serial No. 62,575. (No model.)

*To all whom it may concern:*

Be it known that I, THOMAS A. EDISON, of Menlo Park, in the county of Middlesex and State of New Jersey, have invented a new and useful Improvement in Processes of and Apparatus for Generating Electricity, (Case No. 417,) of which the following is a specification.

The object I have in view is to generate electricity directly from carbon, coal, or other carbonaceous material without the loss caused by the indirect method heretofore employed of converting the same into a motive power, from which electricity is produced by mechanical motion. This I accomplish by employing carbon or carbonaceous material for the generating or soluble electrode of a generating-cell and in using therewith as an active agent oxides, salts, or compounds of elements, by the decomposition of which the carbon or carbonaceous material will be acted upon at high temperatures. The cell is constructed and adapted for the application of heat externally thereto, and the conducting or negative electrode of the cell is made of a substance which in the presence of carbon at high temperatures is not attacked to any great extent by the active agent employed.

The carbon electrode may be constructed in the form of a solid cylinder of any desired size. It may be made of powdered bituminous coal, which is mixed with a little tar and pressed into a cylindrical iron retort by means of a follower and screw. The coal is then coked, the follower being forced upon it by the screw as the volatile portions pass off. The result of coking the bituminous coal under pressure is a compact solid cylinder of carbon of low electrical resistance. The carbon cylinder can also be of charcoal, formed by carbonizing wood in a close retort or vessel at a high temperature, which has the effect of making an exceedingly compact charcoal of low electrical resistance. The inclosing vessel is a pot, preferably of metal, which forms, preferably, of itself the inert or conducting negative electrode of the cell. Iron is a good material for the purpose. The pot has an open top closed by an insulating cover, which may be of fire-clay, and through which the carbon cylinder passes, the carbon cylinder being supported by said cover or by a block in the bottom of the pot, which block is made of fire-clay or of an insulating material not attacked by the particular active agent or compound used. The pot is placed in a suitable furnace for giving the requisite heat and it is connected with one circuit-conductor, while the carbon cylinder is connected with the other. For this purpose the end of the carbon cylinder may be first electroplated and the conductor then soldered thereto, or the conductor can be connected mechanically with the carbon cylinder and the union perfected by electroplating. The active agent of the cell may be any of the oxides, salts, or compounds of elements by the decomposition of which oxides, salts, or compounds carbon will be attacked at high temperatures.

A fusible oxide may be used, such as oxide of lead, and a flux may or may not be added, according as the melting-point of the oxide used is high or low. The action of the cell with a fusible oxide will be explained. The heat of the furnace fuses the oxide at the same time that it raises the carbon to a temperature at which it combines rapidly with oxygen. A reduction of the oxide takes place, the oxygen combining with the carbon and forming carbon monoxide, which passes off and may be conducted to the combustion-chamber of the furnace and used for fuel, it being burned to carbonic acid, while the metal or metalloid or other product is carried to the other electrode, being deposited upon the walls of the containing vessel or pot. During the oxidation of the carbon an electric current flows through the circuit of the cell, which current may be utilized in any way desired or serve to charge secondary batteries for future use. The product of the reduction of the oxide may be re-oxidized by the ordinary methods and used over again as the active agent of the cell.

When a compound, either liquid or solid, is used as the active agent which vaporizes before the carbon reaches the high temperature at which it is acted upon by an element of the compound employed, then a closed melting-pot must be used capable of withstanding pressure and preventing the escape of the vapor.

When the carbon cylinder becomes considerably reduced in size, it may be removed from the pot and used for fuel, while a fresh carbon cylinder will be put in its place and the active agent will be renewed.

Apparatus suitable for carrying out the process is illustrated in the drawing, in which—

A represents a suitable furnace, and B an iron vessel or melting-pot placed partly therein and heated thereby.

C is the cylinder of carbon or carbonaceous material formed as before described and resting on fire-clay block $a$. The cover $b$ of the pot is also of fire-clay. The circuit connections 1 2 are made with the pot B and carbon cylinder C, the latter in the manner before explained.

D represents the active agent or compound of the cell.

What I claim is—

1. The process of generating electricity, consisting in subjecting a body of carbon or carbonaceous material to a high temperature in the presence of an active agent composed of a body of oxides capable of combining with carbon at a high temperature, and a positive element composed of a metal not acted upon by such active agent, but located in contact therewith, substantially as set forth.

2. The process of generating electricity, consisting in subjecting a body of carbon or carbonaceous material to a high temperature in the presence of an active agent composed of an oxide, and a positive element composed of a metal not acted upon by such active agent, but located in contact therewith, substantially as set forth.

3. The combination of a cell, a carbon electrode, and a fusible oxide with means for applying heat to the cell, the oxide being fused and the carbon raised to the temperature at which it combines with oxygen simultaneously, substantially as set forth.

4. The combination of a cell, a carbon electrode, an active agent consisting of oxide of lead, and means for applying heat to the cell, whereby a current is generated when the temperature is sufficiently raised, substantially as described.

5. In a generating-cell, the combination of a carbon electrode and a metallic electrode with a compound one element of which attacks carbon at high temperatures, an inclosing vessel, and a heating-furnace, substantially as set forth.

6. The combination of an inclosing vessel or pot of iron forming one electrode of a generating-cell, and a furnace heating such pot, with a carbon electrode and a compound one element of which attacks carbon at high temperatures, substantially as set forth.

7. The combination, with a melting-pot and furnace, of a compound one element of which attacks carbon at high temperatures, and a generating or soluble electrode composed of compressed and consolidated carbon or carbonaceous material, substantially as set forth.

This specification signed and witnessed this 19th day of May, 1882.

THOMAS A. EDISON.

Witnesses:
EDW. C. ROWLAND,
C. P. MOTT.